United States Patent
Sauer

[11] 4,101,021
[45] Jul. 18, 1978

[54] APPARATUS FOR CONVEYING BULK MATERIALS

[75] Inventor: Walter Sauer, Aschaffenburg, Germany

[73] Assignee: Hans Giesbert KG, Mombris, Germany

[21] Appl. No.: 708,130

[22] Filed: Jul. 23, 1976

[30] Foreign Application Priority Data

Sep. 10, 1975 [DE] Fed. Rep. of Germany ... 7528530[U]

[51] Int. Cl.² .................. B65G 33/16; B65G 33/32
[52] U.S. Cl. .................. 198/668; 64/175 P; 403/58
[58] Field of Search .............. 198/668, 666, 667; 403/58; 64/2 P, 175 P

[56] References Cited

U.S. PATENT DOCUMENTS

| | | | |
|---|---|---|---|
| 1,933,404 | 10/1933 | Allen et al. | 198/668 |
| 2,127,922 | 8/1938 | Ketchpel | 198/668 |
| 2,436,336 | 2/1948 | Slater | 403/58 |
| 2,826,052 | 3/1958 | Stillwagon | 64/175 P |
| 2,830,695 | 4/1958 | Fennimore et al. | 198/668 |
| 2,888,128 | 5/1959 | Allen | 198/666 |
| 2,895,314 | 7/1959 | Helm | 64/2 P |
| 3,045,454 | 7/1962 | Rueb | 64/175 P |

*Primary Examiner*—Evon C. Blunk
*Assistant Examiner*—Jeffrey V. Nase
*Attorney, Agent, or Firm*—Morris Liss; Israel Gopstein

[57] ABSTRACT

A bulk material conveying mechanism including a series of tubular elements each having a screw convolution attached to the exterior of the element body. Universal joints connect confronting ends of adjacent tubular elements to allow the elements to conform with the curvature of an enclosing chute.

1 Claim, 2 Drawing Figures

APPARATUS FOR CONVEYING BULK MATERIALS

FIELD OF THE INVENTION

The invention relates to an apparatus for conveying bulk materials, especially feed for small animals, with a conveying chute and a motor-driven conveyor screw arranged therein.

BRIEF DESCRIPTION OF THE PRIOR ART

It is conventional to utilize, especially for feeding poultry kept in cages, feed conveyors consisting of a conveying chute with a conveyor screw disposed therein. The conveyor screw is driven by a motor and moves the feed, dispensed in metered quantities, from the feed point along the front of cages. It is customary in many cases to arrange a considerable number of cages in series so that the feed chute with the conveyor screw can be up to 100 meters and more. In this connection, it is customary to arrange the conveying chute, the conveyor screw, and the drive mechanisms so that the feed can be conveyed around the batteries of cages, which are fashioned to have two sides. In order to obtain this objective, the ends of the conveyor screws arranged longitudinally and laterally of the battery of cages must be coupled with one another by angular drives. These angular drives are very expensive.

BRIEF DESCRIPTION OF THE PRESENT INVENTION

The present invention is based on the problem of providing a novel type of connection between the linearly extending screw sections arranged longitudinally and laterally of the cages. The posed problem is solved by the features that the conveying chute has points of diversion, and that the conveyor screw consists, in the zone of the diversion points, of individual segments joined together by connecting elements.

It is now possible, instead of providing the heretofore employed individual conveying chutes extending longitudinally or laterally of the battery of cages, to combine two or more conveying chutes by the diversion points and have the feed lying therein conveyed by only a single conveyor screw consisting, in the zone of the points of diversion, of individual segments. Swivel pins are preferably utilized as connecting elements between the individual segments.

It is advantageous if the segments of the conveyor screw are formed from tubular sections with screw parts attached thereto. In this case, a very advantageous coupling can be established between the segments and the swivel pins by fashioning the swivel pins with the segments into universal joints. For this purpose, the swivel pins have bores at each of their ends, these bores being offset by 90° with respect to each other. By way of studs inserted in the bores, the swivel pins can be connected with the segments, the swivel pins being pushed into the tubular apertures of the segments. The swivel pins can taper toward their centers to attain a maximally great deflection of the joint coupling with a simultaneously maximum strength of the swivel pins.

The invention will be explained in greater detail below with reference to an embodiment, to wit:

FIG. 1 shows a fragmentary view of a point of diversion of a conveying chute with conveyor screw segments; and FIG. 2 shows a swivel pin.

DETAILED DESCRIPTION OF THE INVENTION

Figure 1:
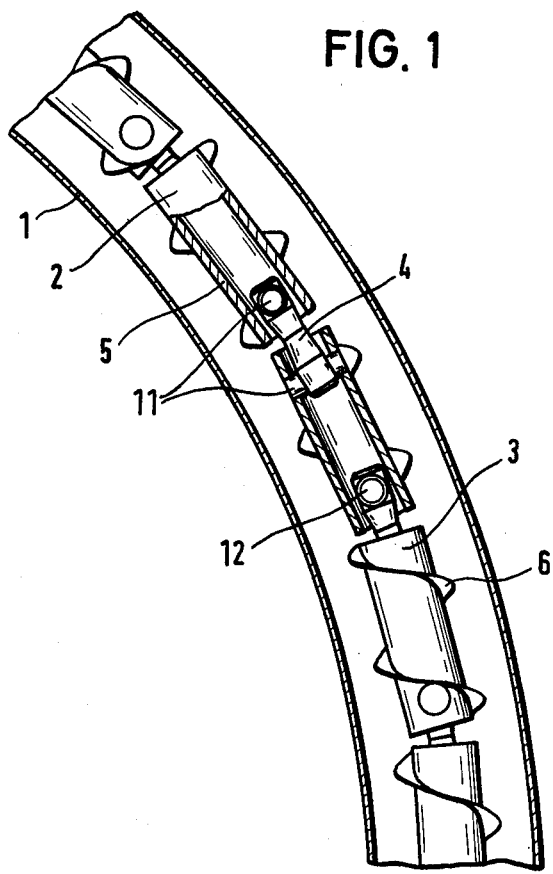
Figure 2:
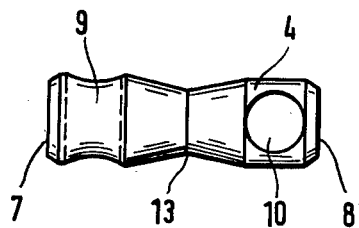

The construction of conveying chutes with conveyor screws is known per se, and thus a more detailed illustration is unnecessary. FIG. 1 merely shows a partial view of a conveying chute 1 at the point of diversion. The diversion point is at the transition between the conveying chutes with conveyor screw extending longitudinally and laterally of a battery of cages. The diversion amounts to 90°. It is to be noted that the diversion points according to this invention can be arranged, if necessary, also at other locations along a battery of cages or generally in connection with a conveying chute with conveyor screw for the transportation of bulk materials. Also, any desired angle of diversion can be obtained.

In the zone of the point of diversion, the conveyor screw 2 consists of individual segments 3 joined together by the swivel pins 4 serving as the connecting elements. Segments of any desired shape can be employed. In the present case, however, segments 3 are utilized which consist of tubular sections 5, shown in a sectional view in the two middle segments illustrated in the drawing. The screw parts 6 are mounted by welding onto the tubular sections 5. In the illustrated embodiment, each tubular section 5 is provided with a screw part 6 having two windings. All segments 3 are identical to one another.

The coupling of the segments 3 to one another takes place by way of the swivel pins 4 and the rivet bolts 11. The studs 11 are extended through the bores 9 and 10, offset by 90° with respect to each other, pertaining to the ends 7 and 8 of the swivel pins 4 and are riveted to the tubular sections 5. Previously, the tubular sections 5 have been provided with corresponding bores 12 to pass the studs 11 therethrough. In this way, a universal joint is formed, imparting to the individual segments 3 a maximum mobility. Toward their centers 13, the swivel pins 4 are fashioned to be tapered, whereby the segments 3 can be deflected to a very great extent with respect to each other without the swivel pins 4 losing their strength. For the sake of clarity, only one swivel pin 4 has been illustrated.

It should be understood that the invention is not limited to the exact details of construction shown and described herein for obvious modifications will occur to persons skilled in the art.

I claim the following:

1. Apparatus for conveyance of feed for small animals comprising:
    conveying chute means having curved sections therein,
    motor-driven conveyor screw means disposed within said conveying chute means, said conveyor screw means comprising within said curved sections thereof:
    (a) a plurality of individual screw segments,
    (b) said screw segments each comprising a tubular section,
    (c) said tubular sections each having a screw part outwardly disposed and integrally formed thereon,
    (d) said screw segments being joined by elongated swivel pins mounted therebetween,
    (e) said swivel pins comprising tapered and non-tapered sections, (f) said non-tapered sections being located towards the ends of said swivel pins with said tapered sections located therebetween and tapering towards each other,
(g) said non-tapered sections having bores therein,
(h) stud means for joining said swivel pins to said tubular sections,
(i) said bores receiving said stud means and
(j) said tubular sections receiving said non-tapered sections of said swivel pins.

* * * * *